Dec. 11, 1923.
O. S. MARSHALL
1,477,374
DIVIDING HEAD
Filed June 3, 1920
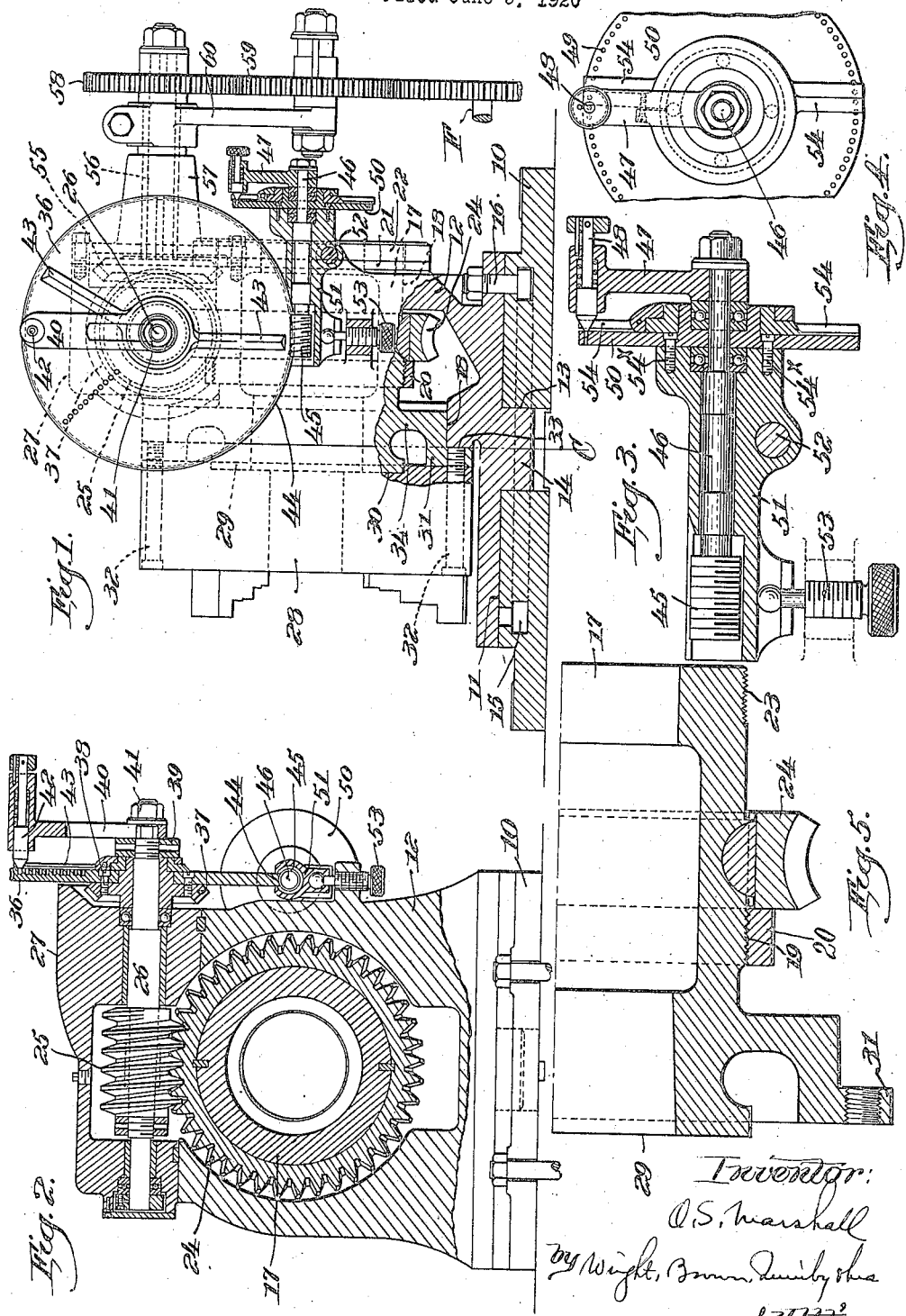

Patented Dec. 11, 1923.

1,477,374

UNITED STATES PATENT OFFICE.

OSCAR S. MARSHALL, OF SPRINGFIELD, VERMONT.

DIVIDING HEAD.

Application filed June 3, 1920. Serial No. 386,338.

*To all whom it may concern:*

Be it known that I, OSCAR S. MARSHALL, a citizen of the United States, residing at Springfield, in the county of Windsor and State of Vermont, have invented new and useful Improvements in Dividing Heads, of which the following is a specification.

This invention relates to indexing or dividing heads for milling machines, and the like, and more especially to that class wherein the work is supported by said heads.

An object of this invention is to produce a dividing head which has a main indexing device, and a supplemental indexing device so arranged and constructed as to enable the operator to use the main device independently of the supplemental device for ordinary work, and for rapid indexing, while said supplemental device may be manipulated to give slight angular movements to the work, less than that between the closest stopping positions of the main indexing device and using the latter as part of the transmission means.

It occasionally happens that the main indexing device alone does not quite meet the requirements of certain work, in which case the supplemental device again comes into play, the main index first being set to give the work a rapid angular movement, as near the amount required as the spacing of the fixed positions will permit, and thereafter the supplemental device will be set to give the nicety of movement that may be called for.

In this last mentioned instance, the setting and manipulation of both devices combined gives the result desired; the main device, being more direct in its action, sets the work to nearly its proper angle rapidly, while the supplemental device, acting through a gear train, acts relatively more slowly and gives less movement to the work for a corresponding movement of its actuating member.

Another object of this invention is to so construct and arrange the head, and in this instance the chuck carried thereby, that the weight of said parts will be approximately equally distributed about the vertical rotational center of the said head. This distribution of the weights overcomes the tendency of the head to cramp during the horizontal swing thereof, and greatly reduces the wearing tendency of the bearing surfaces, resulting in longer life and continued accuracy of the initial setting or alignment of the head.

A further object of this invention is to produce a more stable means, of securing the chuck to the spindle, than the screw thread connection usually employed.

For these purposes the spindle is provided with an annular flange of approximately the same diameter as the chuck to be used; said chuck being bolted to said flange, which acts as a thrust bearing for the chuck, and therefore great stability is imparted to said chuck by reason of the change of location of the thrust bearing from near the center of the chuck to a location near its circumferential line.

By eliminating the usual screw connection between the chuck and the spindle, and bolting said chuck to the spindle, a ready means of separation of the two is afforded.

Heretofore it has oftentimes been necessary to hammer the chuck to start it off the screw of the spindle. Naturally the employment of such harsh methods to free the chuck from the spindle results in bad effects upon the head in general,—at times actually breaking the teeth of the worm or worm wheel, and always injuring the bearings, causing looseness of the parts and consequently loss of accuracy of the head. However this phase of the invention is not claimed herein, but forms the subject of a divisional application.

It is also an object of this invention to provide means to utilize an indexing device or devices for work other than so called "straight work," as for instance the cutting of helical gear teeth or other spiral forms, and to that end the supplemental device is so constructed and arranged that it may be readily engaged with or disengaged from the main device.

The invention further consists of certain novel features of construction and arrangement of parts which will be fully understood from the following detailed description and statements of claim, with reference to the drawings.

For the purpose of illustrating the invention, one preferred form thereof is illustrated in the drawings; this form having been found to give satisfactory and reliable results, although it is to be understood that the various instrumentalities, embodied in the invention, can be variously arranged and organized, and that the invention is not limited to the precise arrangement and organization of these instrumentalities, as herein shown and described.

Of the drawings:

Figure 1 represents a side elevation, partially broken away, of the preferred form of indexing head with the present invention applied thereto.

Figure 2 is a cross section on a plane which passes through the drive means intermediate the index devices and the spindle.

Figure 3 is an enlarged sectional detail of the supplemental indexing device to be described.

Figure 4 is a front elevation of some of the parts shown in Figure 3.

Figure 5 is an enlarged fragmentary view of the spindle in section, detached from the head.

Similar characters designate like parts throughout the drawings.

Referring to the drawings,

The base 10 having formed thereon the bearing surface 11 for the rotatably mounted head 12, is provided with a central hole 13 to receive a boss 14 depending from the head 12; said boss acting as a pivot about which said head 12 may be horizontally rotated.

An annular undercut groove 15 in the base 10 receives the head of a hold-down clamping screw 16 for the head 11.

Revolubly mounted in the head 12 is the spindle 17, suitable bearings 18, 18 being provided therefor.

The spindle 17 is threaded at 19 to receive the collar 20, which acts in the capacity of a stop for a worm gear to be described. Said spindle 17 is held in place by a nut 22 screwed on the threaded end 23 of the spindle and bearing against the outer face of the rear bearing 18 and interposed washer 21.

Keyed to the spindle 17 is a worm gear 24 adapted to be engaged and rotated by the worm 25 fast on the shaft 26 suitably mounted in bearings in a removable cap 27, which in turn is mounted on the head 12.

An object of this invention is to provide a thrust bearing for the chuck 28 that will receive and distribute the shock and strain, of working conditions, over a greater area and more effective location than heretofore.

The spindle 17 at its left end (see Figures 1 and 5) is provided with a chuck centering flanged portion 29, which is received in a recess 30 of the chuck 28, and a flange 31, to which the said chuck is adapted to be secured by means of bolts 32.

The said flange 31 finds a bearing surface at 33 on the head 12 of a diameter equal to that of the chuck 28.

It will be readily seen that the above construction affords a very stable backing for the chuck, and one that receives and distributes shocks to the greatest advantage.

Another feature of this invention is the ease with which the chuck can be removed from the spindle by removing the bolts 32, this being a great advantage over the old method, where it was sometimes necessary to hammer the chuck in order to start it off the screw of the spindle.

Obviating the necessity of hammering the chuck to remove it assures longer life and continuance of accuracy to the finely machined and adjusted working parts of the head.

Another particular advantage gained in the present construction and arrangement consists of the approximately equal distribution of the weights of the head and chuck about the rotational center of the said head, indicated at C, Fig. 1.

As seen in Figure 1, of the drawings, the overhang of the chuck 28 is so disposed that the weight of the said head and chuck will be equally, or nearly, disposed over and sustained by the bearing surface 11 of the base 10.

This is of considerable advantage, as it eliminates the tendency to cause a tilting of the head, and consequently wear of the bearing surface is greatly reduced and greater accuracy is maintained.

In the present invention the chuck is adapted to be the sole support or holding device for the work, or it may act to control the angular position of the work and as a center of rotation therefor in conjunction with another device not shown.

In the cutting of gear teeth, or the like, it is necessary to employ a dividing or indexing device to properly gauge the work through its predetermined angular movement. In this instance the indexing device consists of a disk or primary index plate 36, having a series of perforations therein, each series being arranged in a circle and the perforations of each series being spaced differently from that of the adjacent series, all as usual in devices of this kind, one perforation only of each series being shown in the drawing.

The index plate or disk 36 is mounted upon the hub of a bevel gear 37 and secured thereto by means of the screws 38; said gear being loose on the shaft 26 and held thereon by the nut 39.

The right end of the shaft 26 is slabbed or squared at opposite sides thereof and passes through the slot of the slotted lever or crank 40, which is capable of endwise movement at right angles to the said shaft, and may be clamped thereto at the desired position by means of nut 41.

The upper end of the crank 40, Figure 2, carries a spring pressed locking pin 42, which is adapted to be entered in any of the perforations in the disk 36 at the will of the operator.

The usual adjustable sectors or stop arms 43 are provided to indicate the hole or perforation into which the index pin 42 is to be placed after indexing.

The device just described is sufficient for some work, but in other cases movements of the work through smaller angles than those permitted by even the most closely spaced of the holes in disk 36, setting in positions not governed by any of these holes, is required, and for such cases I have prescribed the supplemental indexing device that will now be described.

The disk 36 has teeth 44 cut in the edge thereof, adapted to be engaged by the worm 45 fast on the shaft 46. Also fastened on shaft 46 is a crank or lever 47, the upper end of which (see Figure 3) carries a spring pressed pin 48 shown as engaged with one of a circular series of holes 49 in the disk or secondary index plate 50.

The shaft 46 finds its bearing in the tiltable bracket 51, said bracket being pivoted at 52 to the head 12, and being under the control of a thumb screw 53, which has a ball and socket connection with said bracket 51.

Through the said screw 53, the bracket 51 may be tilted to cause engagement or disengagement of the worm 45 with the teeth 44 of the disk 36.

The disk 50 is prevented from rotation by the screws 54ˣ, which secure it to the bracket 51.

Adjustable sectors or stop arms 54 are likewise here employed to indicate the hole in which the pin 48 is to be placed after indexing.

As shown in the drawings, the index devices are in position to operate in conjunction, and supposedly the work to be operated upon requires an indexing not possible to obtain by the main index device alone, but requires a finer angular movement which will be supplied by the supplemental device.

As rapidity of action is essential to production, and as the main device causes a more rapid angular movement to the work than the supplemental device, the sector arms 43 of that device are first set in the well known way to include between them the number of holes of the index plate over which the crank is to be moved for indexing, being then fixed relatively to each other, but capable of turning in unison about the hub of the index plate 36 and of keeping their position thereon by friction. The sectors 54 are also set in the same way with respect to the index plate 50 for the additional angle through which crank 47 is to be turned.

The cranks 40 and 47 may now be turned the amount indicated by the sector arms, and preferably in the order named. Crank 40, acting through the shaft 26 and worm 25, turns the spindle 17, and the crank 47 acts through the shaft 46, worm 45, disk 36, arm 40, shaft 26, and worm 25, to turn the spindle a greatly reduced amount. After each such movement, both pairs of sectors may be turned ahead by hand, as is well understood by those skilled in the art. The ratio between the worm 45 and spindle 17 in the illustrated device is such that a movement of the crank 47 from one hole to the next would give an angular movement to the spindle of one second in arc, but this ratio, of course, may be varied in other embodiments of the invention.

It is obvious that the disk 50 may be perforated by a series of circles, said perforations being differently spaced in each series, and by so doing a much greater number of angular divisions of movement might be obtained for one revolution of the spindle.

In the cutting of spiral gears, and the like, it is necessary that the spindle 17 shall revolve at a predetermined speed with relation to the feed of the cutting instrument (not shown) and at this time the worm 45 must be disengaged from the teeth of the disk 36.

In order that the spindle may be driven from the feeding means, here diagrammatically indicated by the shaft F, the bevel gear 37 is arranged in mesh with a bevel gear 55 fast on a shaft 56, mounted in a bracket 57, attached to the head 12.

Fast on said shaft 56 is a gear 58 adapted to mesh with a change gear 59, supported by a hanger 60, angularly movable about the hub of the bracket 57 and adapted to be clamped thereto in any position required by the change gear used.

The gears 58 and 59 form a part of a train of gears, which derives motion from any feed shaft, typified by the shaft F.

In the index setting for straight or ordinary work, as previously described, the worm 45 will be in mesh with the worm teeth 44 of the disk 36, which at that time acts as a lock to prevent rotation of the disk and lever 40, and consequently the spindle 17, but for the setting to cut spiral gears, and the like, the worm 45 must be disengaged from the said tooth disk 36, as at that time the spindle must revolve to permit of the proper operation on the work.

Having described my invention, what I claim is:

1. A dividing head comprising in combination a supporting structure, a rotatable shaft, an index plate rotatable independently of the shaft, means for detachably connecting said shaft and index plate together, and speed-reducing gearing directly engaged with said plate for rotating the same.

2. In a device of the class described, a main index device; a supplemental index device, normally in operative engagement with said main index device; a pivoted bracket adapted to support said supplemental device; a manually operated device adapted to swing said bracket about its pivot; a work holding device; and means to transmit movement from said index devices to said work holding device.

3. In a device of the class described, a work or center supporting spindle; a main index mechanism therefor, having a toothed index plate as one member thereof; a supplemental index mechanism having an actuator adapted to engage said toothed plate; means to engage the said actuator with or disengage it from said toothed plate; and means to transmit motion from said index mechanisms to said work supporting spindle.

4. In a device of the class described, a work or center supporting spindle; a main index mechanism having a toothed index plate as one member thereof; a supplemental index mechanism adapted to engage said main index mechanism, comprising a second index plate, a worm gear, and an actuator therefor, adapted to also engage said second index plate at predetermined times; and means to move said supplemental index mechanism into and out of engagement with said main index mechanism.

5. In a device of the class described, a work or center supporting spindle; a main index mechanism having a toothed index plate; a supplemental index mechanism comprising a second index plate, a worm gear, an actuator therefor adapted to also engage said second plate at predetermined times; a bracket upon which said supplemental index mechanism is mounted; and means to move said bracket whereby said supplemental mechanism may be engaged with or disengaged from said main index mechanism.

6. In a device of the class described, a work or center supporting spindle; a main index mechanism having a toothed index plate as one member thereof; a supplemental index mechanism comprising a pivoted bracket; a shaft carried thereby; a worm on said shaft adapted to at times engage said toothed plate; a lever on said shaft adapted to operate said worm; a second index plate adapted to be at times engaged by a pin on said lever; and manually operated means to swing said bracket about its pivot.

7. In a device of the class described, a work or center supporting spindle; a main index mechanism, having a toothed index plate as one member thereof; a supplemental index mechanism; a pivoted bracket upon which said supplemental mechanism is mounted; a screw having a ball and socket connection with said bracket whereby said supplemental mechanism may be moved into and out of operative position with said main index mechanism; and means to transmit motion from said main index mechanism to said spindle.

8. In a device of the class described, a work or center supporting spindle; a main index mechanism having a toothed index plate as one member thereof; a supplemental index mechanism having a worm adapted to engage said toothed plate whereby said plate may be rotated at will or held in locked position; a bracket upon which said worm is mounted; and a screw having ball and socket connection with said bracket adapted to move said bracket, and consequently said worm to and from operative engagement with said toothed disk.

9. In a device of the class described, a work or center supporting spindle, a main index mechanism having a toothed index plate as one member thereof; a gear to which said plate is secured; a supplemental index mechanism having a worm normally in engagement with said toothed plate; a bracket upon which said supplemental mechanism is mounted; a feed shaft; a gear train intermediate said gear, and said feed shaft adapted to drive said spindle through said main index mechanism; and manually operated means adapted to disengage said worm from said toothed plate prior to starting the machine.

10. An indexing mechanism comprising a work holding spindle, a driving spindle in geared relation with said work holding spindle, a crank for rotating the driving spindle, an index plate cooperating with said crank, said plate and crank having cooperating means for locking one to the other in various angular relations, a third spindle in geared relation to said index plate, a crank on said third spindle, and a second index plate in cooperative relation with the last-named crank.

11. An indexing mechanism comprising a spindle, a crank connected therewith for imparting rotative movement thereto, an index plate having sectors cooperating with said crank for limiting the indexing motion of the latter, means for rotating said plate, and indexing means associated with the last-named rotating means for determining the amount of the latter.

12. In an indexing mechanism the combination of a spindle, a crank, a rotatable indexing plate cooperating with said crank, a spindle geared to said index plate for rotating the latter, a crank on the last-named spindle, and a rigidly fixed index plate cooperating with the last-named crank.

13. An indexing mechanism including a crank element, an index device cooperating with said crank element for determining the angular movement thereof, and with which said element may be interlocked, a secondary crank in permanent geared relation with said index device and adapted to move it and the crank element, and a fixed index means cooperating with the last-named crank.

14. An indexing mechanism comprising the combination with a rotatable shaft of a coaxial separately rotatable index member, a crank fixed on said shaft, said crank and indexing member having cooperative means to effect interlocking in different angular relations one to the other, and a secondary indexing means geared to the first indexing means in a manner to effect a slow movement of the latter.

15. An indexing mechanism comprising the combination of a rotatable crank, an independently rotatable index plate coaxial with said crank, complemental disengageable interlocking means between said plate and crank, by the engagement of which said crank and plate may be turned in unison and by disengagement of which the crank may be turned independently, stop members associated with said index plate and being angularly adjustable around the axis thereof, and a secondary crank in speed-reducing driving relation with said index plate.

16. An indexing mechanism comprising the combination of a rotatable crank, an independently rotatable index plate coaxial with said crank, complemental disengageable interlocking means between said plate and crank, by the engagement of which said crank and plate may be turned in unison and by disengagement of which the crank may be turned independently, and a secondary crank in speed-reducing driving relation with said index plate.

In testimony whereof I have affixed my signature.

OSCAR S. MARSHALL.